July 11, 1961

J. MIHAILA 2,991,660

PHONOGRAPH DRIVE

Filed April 20, 1960

INVENTOR.
JOHN MIHAILA
BY Woodling and Krost
ATTORNEYS

July 11, 1961

J. MIHAILA 2,991,660

PHONOGRAPH DRIVE

Filed April 20, 1960

*INVENTOR.*
JOHN MIHAILA
BY *Woodling and Krost,*
ATTORNEYS

United States Patent Office

2,991,660
Patented July 11, 1961

2,991,660
PHONOGRAPH DRIVE
John Mihaila, Alliance, Ohio, assignor to Consolidated Electronics Industries Corporation, a corporation of Delaware
Filed Apr. 20, 1960, Ser. No. 23,495
18 Claims. (Cl. 74—190)

The invention relates in general to a phonograph drive mechanism and more particularly to a mechanism wherein a cam is manually and directly moved to control shifting operations for a plurality of speeds.

An object of the invention is to provide a phonograph drive mechanism which provides a plurality of speeds with a simplified speed selector mechanism.

Another object of the invention is to provide a plural speed phonograph drive mechanism with a minimum number of parts, yet retaining all the advantages and refinements of currently available more complex drive mechanisms.

Another object of the invention is to provide a more economical phonograph mechanism without sacrificing quality.

Still another object of the invention is to provide a plural speed phonograph mechanism which has a more positive and direct action and a better "feel" to the operator during shifting operations.

Still another object of the invention is to provide a plural speed phonograph drive mechanism with an off-position with the power train disengaged and also one wherein the power train is disengaged during shifting operations.

Other objections and a fuller understanding of the invention may be had by referring to the following description and claims, taken in conjunction with the accompanying drawings, in which:

Figure 1:
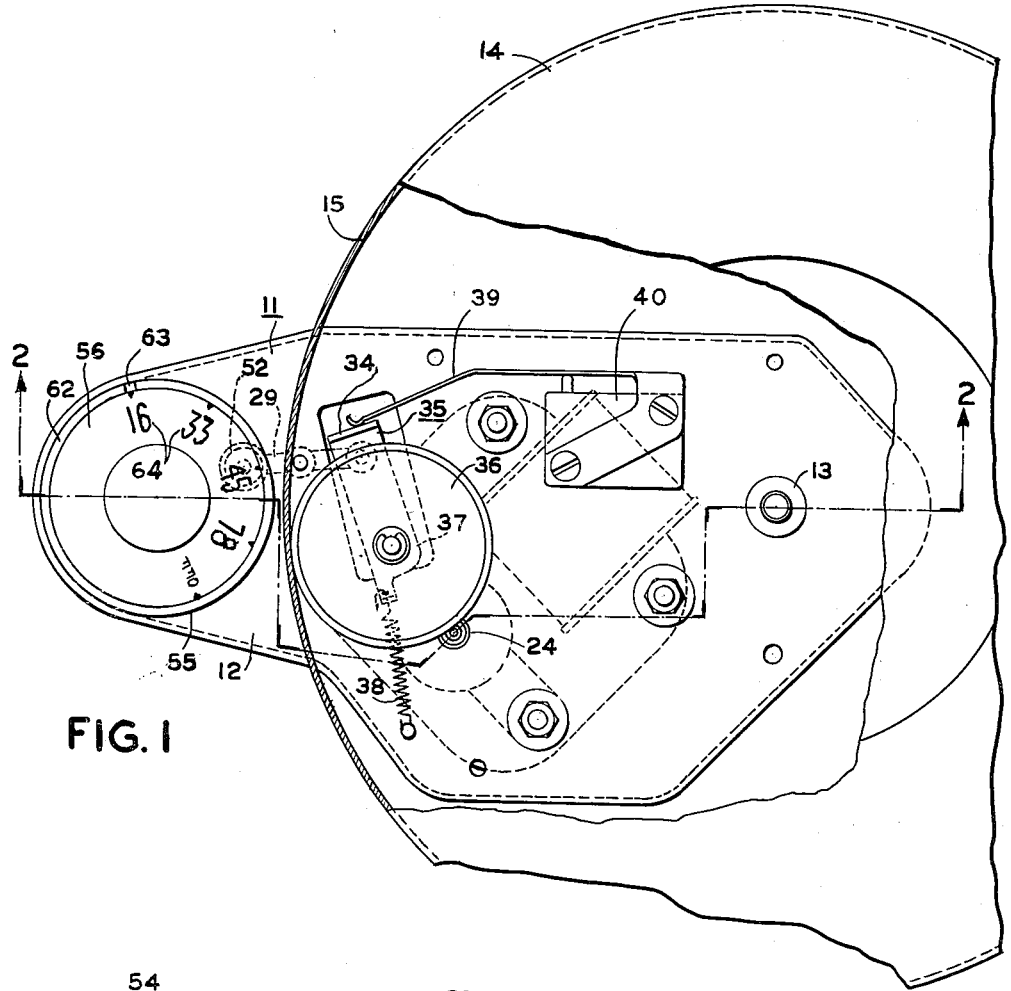
FIGURE 1 is a plan view, with some parts broken away, of a phonograph drive mechanism incorporating the invention.
Figure 2:
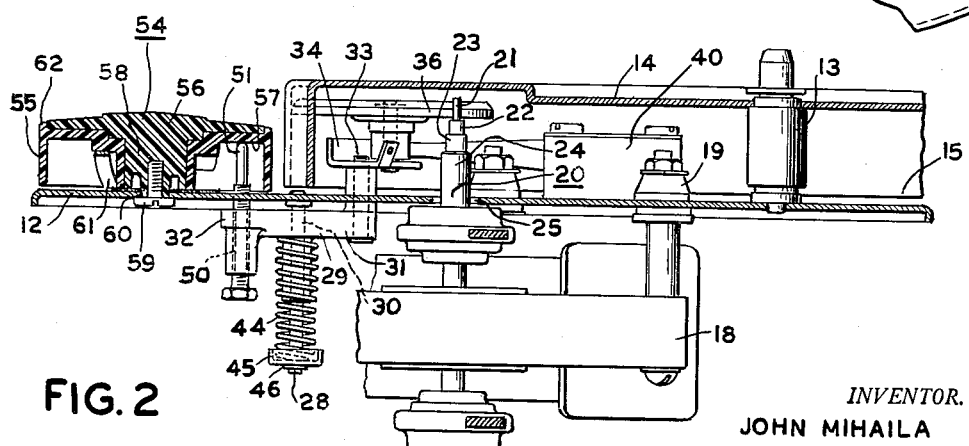
FIGURE 2 is an elevational sectional view on the line 2—2 of FIGURE 1.

The figures show a complete phonograph drive mechanism 11 which includes a generally horizontal frame 12 carrying a bearing 13 for journaling a turntable 14. This turntable has a downturned rim 15.

An electric motor 18 is dependently carried by shock mounts 19 from the frame 12 and this motor is connected to drive a drive shaft 20. This drive shaft 20 extends vertically to a level above the frame 12 and is disposed inside the rim 15. The drive shaft 20 has different effective drive diameters at different levels and this is established by first through fourth steps 21 through 24. The drive shaft 20 extends upwardly through an aperture 25 in the frame 12.

A vertical lifter stud 28 is dependently fixed on the frame 12 near the turntable rim 15. A lifter bracket 29 has a central aperture 30 surrounding the lifter stud 28 so that this lifter bracket may both move vertically and in an arcuate manner. This arcuate movement means that first and second parts or first and second sides 31 and 32 of the lifter bracket may move with a horizontal component. The first side 31 has an aperture journaling a post 33 fixedly carried on a first end 34 of an idler plate assembly 35 and thus this idler plate assembly is journalled on the first side 31 of the idler bracket 29. An idler wheel 36 is journalled on a second end 37 of the idler plate assembly 35. An idler spring 38 urges the idler wheel 36 toward concurrent engagement with the drive shaft 20 and the turntable rim 15. An actuator arm 39 actuated by retractile movement of the idler plate assembly 35 may control a switch 40 in turn controlling energization to the motor 18.

A compression spring 44 surrounds the lifter stud 28 and a part of the lifter bracket 29. The lower end of this compression spring 44 bears against a cup 45 held by a snap ring 46 in a groove in the lower end of the lifter stud 28, and accordingly, this compression spring 44 urges upwardly the lifter bracket 29.

The second side 32 of the lifter bracket 29 contains a vertically threaded aperture 50 which threadably receives a cam follower pin 51. This threaded connection is a means to adjust the relative position of the cam follower pin 51 and the lifter bracket 29. The pin 51 extends upwardly loosely through a large aperture 52 in the frame 12.

An indicator and control assembly 54 includes generally a movable member 55 and a statonary member 56. The movable member 55 is a rotatable knob which has a downwardly facing cam 57. The stationary member 56 is a stationary indicator plate which has a central stud 58. A screw 59 passes upwardly through an aperture 60 in the frame 12 and passes through a detent spring 61 into the central stud 58 to fixedly attach the detent spring 61 and the stationary indicator plate 56 relative to the frame. The rotatable knob 55 is journalled on the cylindrical portion of the central stud 58 and lies underneath the indicator plate 56 except for an exposed outer rim 62. This outer rim 62 has an index mark 63 for cooperation with indicia 64 on the upper surface of the indicator plate 56. This index mark and indicia provides visual information to the operator of the drive mechanism 11 as to the selected speed of the phonograph mechanism, for example, 16, 33, 45 or 78 r.p.m. plus an off position. The mechanism 11 is shown in the 16 r.p.m. or slowest speed position. The detent spring 61 may be riveted to the frame at an aperture 65 and lanced lugs 66 on the detent spring 61 enter slots 67 on the underside of the central stud 58 to correctly orient and fixedly hold this central stud 58.

Figure 3:
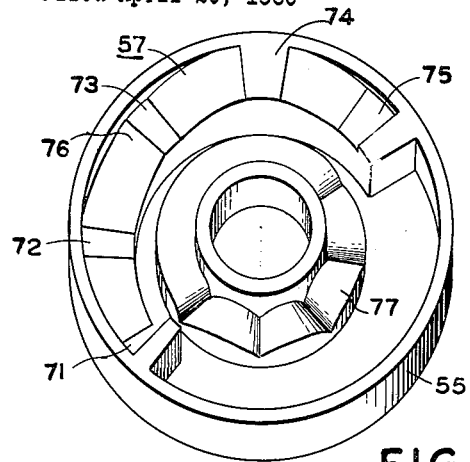
FIGURE 3 is a three-dimensional view of the underside of the cam and knob.
Figure 5:
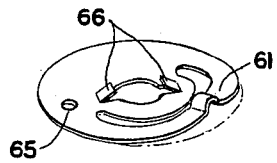
FIGURE 5 is a three-dimensional view of the detent spring.
Figure 4:
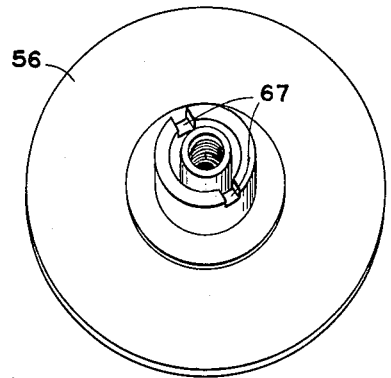
FIGURE 4 is a three-dimensional view of the underside of the stationary indicator plate.
Figure 6:
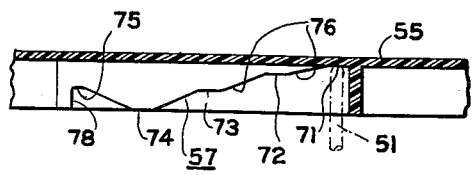
FIGURE 6 is a developed view of the cam surface.
Figure 7:
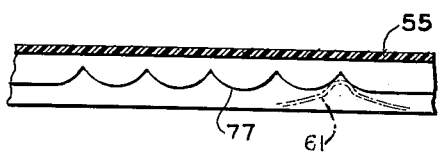
FIGURE 7 is a developed view of the detent surface in the cam knob.

The cam 57 is better shown in FIGURE 3 and is shown developed in FIGURE 6. It includes first, second, third, fourth and fifth plateaus 71 through 75 interconnected by inclined cam surfaces 76. The under surface of the knob 55 also includes a detent surface 77 for cooperation with the detent spring 61 to establish five different detent positions of the knob 55. This detent surface 77 is shown in FIGURE 3 as lying inside the cam 57 and is shown developed in FIGURE 7. The first plateau 71 is at the highest level in the knob 55 and when the cam follower pin 51 is in engagement therewith it establishes the lifter bracket 29 at a level such that the idler wheel 36 is at the level of the first drive shaft step 21. The compression spring 44 acts to urge together the cam follower pin 51 and the cam 57. The second, third and fourth plateaus 72, 73 and 74 establish corresponding levels of elevation of the idler wheel 36 for selected engagement with the drive shaft steps 22, 23 and 24, respectively. The detent spring 61 engages the notches at the detent surface 77 at points diametrically opposite the corresponding plateau 71–75 and these detent notches establish definite positions for the rotatable knob for each of the selected speeds of the mechanism 11.

The fifth plateau 75 is on a level approximately the same as that of the third plateau 73 and a vertical abutment 78 is adjacent this fifth plateau 75. This abutment 78 is adapted to engage the vertical side of the cam follower pin 51 when the detent spring 61 is in the corresponding detent notch.

*Operation*

The rotatable knob 55 may be manually grasped by the operator to be rotated to select a different speed of the drive mechanism 11 or to select an off condition. The knob 55 is shown in the position whereat the cam follower pin 51 cooperates with the first plateau 71 to establish the slowest speed condition which is when the idler wheel 36 is in driving engagement with the drive shaft step 21. As the knob 55 is rotated clockwise, as viewed in FIGURE 1, the cam follower pin 51 engages the inclined cam surfaces 76. This causes two movements to occur; the first movement being the downward change in elevation of the lifter bracket 29 so that the idler wheel 36 will be at the level of the second drive shaft 22 when the cam follower pin 51 engages the second plateau 72; and the second movement being an arcuate movement or one which provides a horizontal component of movement to the lifter bracket 29. Because the inclined cam surface 76 is at an angle to the horizontal this provides a component of movement tending to rotate the lifter bracket 29 counterclockwise, as viewed in FIGURE 1. This retracts the idler plate assembly 35 from the drive shaft 20. This retractile movement enables the idler wheel to clear the shoulder between the steps 21 and 22 during the speed shifting operation. A similar retractile movement of the idler wheel is achieved for each separate shifting movement as the knob is moved from the first plateau 71 to the fourth plateau 74 in cooperation with the cam follower 51. Accordingly, first through fourth speed positions from the slowest to the fastest are achieved when the cam follower 51 cooperates with the plateaus 71—74, respectively.

When the knob 55 is turned in a counterclockwise direction from the fourth speed position toward the first speed position, then the cam follower pin 51 will again ride on the inclined cam surfaces 76, but in this case the component of movement imparted to the lifter bracket 29 by the angle of the cam surface 76 will be such as to cause the idler wheel 36 to move toward the drive shaft 20. This does not affect the ease of shifting, however, since the idler wheel 36 may merely slide upwardly off one shoulder toward the next smaller drive shaft step.

With the knob 55 in the fourth speed position, shown as being 78 r.p.m., it may be rotated still further clockwise to the off position. During this movement the cam follower 51 rides on an inclined cam surface to reach the fifth plateau 75 and then the vertical side of this cam follower pin 51 engages the vertical abutment 78. This abutment 78 is so positioned relative to the corresponding detent notch that the abutment 78 provides a positive retractile movement to the idler wheel 36, and accordingly, this positively retracts the idler wheel 36 from the drive shaft 20. This helps prevent any flat spots on the resilient tire on the idler wheel 36. Also this retractile movement may be made greater than that normally encountered during shifting between speeds, and accordingly, the switch 40 may be actuated to de-energize the motor 18. The abutment 78 and the inclined cams are therefore means to interrupt the power train from the motor 18 to the turntable rim 15 both during shifting and at the off position. The linkage from the cam follower pin 51 through the lifter bracket 29 and the idler plate assembly 35 to the idler wheel 36 is a linkage from the cam follower to the power train for concurrent movement to interrupt the power train, both during shifting and at the off position.

By placing the cam 57 directly on the manually movable member or knob 55 a simplification in the entire drive mechanism 11 is effected and fewer parts are required. Accordingly, the mechanism is more economical for the same function and an added benefit is that the operator has better "feel" of the shifting conditions. This is because there is no linkage between the movable member and the cam which would have any lost motion to impart a false tactile indication of speed shifting conditions.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and the scope of the invention as hereinafter claimed.

What is claimed is:

1. In a plural speed phonograph drive mechanism having a turntable with a downturned rim and journalled on a frame, said mechanism comprising, in combination, a generally vertical drive shaft having different effective diameters at different levels, an idler wheel carried on said frame for vertical and horizontal components of movement, means urging said idler wheel in a direction for concurrent engagement with the turntable rim and drive shaft, a cam follower, means linking one of said idler wheels and said drive shaft to said cam follower for concurrent movement, said cam follower extending generally vertically outside said turntable, a manually movable cam carried on the frame for cooperation with said cam follower, said cam having an inclined cam surface, detent means establishing a plurality of positions for said cam corresponding to a desired relative height of said idler wheel and drive shaft for selected speeds of the phonograph turntable, movement of said cam in one direction causing said cam follower to ride on said inclined cam surface which imparts a movement with a horizontal component to relatively retract said idler wheel and drive shaft concurrently with a change in relative elevation of said idler wheel and drive shaft relatively toward a larger effective drive shaft diameter.

2. In a plural speed phonograph drive mechanism having a turntable with a downturned rim and journalled on a frame, said mechanism comprising, in combination, a motor, a power train from said motor to said turntable rim including a generally vertical drive shaft having different effective diameters at different levels, a cam follower, means linking said cam follower to said power train for concurrent movement to change speed ratios upon movement of said cam follower, said cam follower extending generally vertically outside said turntable, a unitary manually rotatable knob and an inclined cam surface on the underside thereof, said cam surface cooperating with said cam follower, detent means establishing a plurality of relative positions for said cam follower and cam surface corresponding to a desired cooperation of different effective diameters of said drive shaft in said power train for selected speeds of the phonograph turntable, and movement of said knob in one direction causing said cam follower to ride on said inclined cam surface which imparts to the cam follower a movement with a horizontal component to interrupt said power train concurrently with a change in driving condition through the power train toward a larger effective drive shaft diameter.

3. In a plural speed phonograph drive mechanism having a turntable with a downturned rim and journalled on a frame, said mechanism comprising, in combination, a generally vertical drive shaft having different effective diameters at different levels, an idler wheel carried on said frame for vertical and horizontal components of movement, means urging said idler wheel in a direction for concurrent engagement with the turntable rim and drive shaft, a cam follower, means linking one of said idler wheels and said drive shaft to said cam follower for concurrent movement, said cam follower extending generally vertically outside said turntable, a manually rotatable knob having an inclined cam surface and journalled relative to the frame for cooperation with said cam follower, detent means estabishing a plurality of positions for said rotatable knob corresponding to a desired relative height of said idler wheel and drive shaft for selected speeds of the phonograph turntable, movement of said knob in one direction causing said cam follower to ride on said inclined cam surface which imparts a movement with a horizontal component to relatively retract said idler wheel and drive shaft concurrently with a change in relative elevation of said idler wheel and drive shaft relatively toward a larger effective drive shaft diameter, and an abutment on said knob for engagement with said cam follower when said detent means is in one of said detent positions to positively engage the side of said cam follower to relatively retract said idler wheel and drive shaft.

4. In a plural speed phonograph drive mechanism having a turntable with a downturned rim and journalled on a frame, said mechanism comprising, in combination, a generally vertical and stepped drive shaft at a location above the frame, an idler wheel carried on said frame for vertical and horizontal components of movement, means urging said idler wheel in a direction for concurrent engagement with the turntable rim and drive shaft, a cam follower, means linking one of said idler wheels and said drive shaft to said cam follower for concurrent movement, said cam follower extending generally vertically outside said turntable, a manually rotatable knob having a cam journalled relative to the frame for cooperation with said cam follower, said cam having plateaus joined by inclined cam surfaces, each of said plateaus corresponding to a desired relative height of said idler wheel and drive shaft for selected speeds of the phonograph turntable, movement of said knob in one direction causing said cam follower to ride on one of the inclined cam surfaces which imparts a movement with a horizontal component to relatively retract said idler wheel and drive shaft concurrently with a change in relative elevation of said idler wheel and drive shaft relatively toward larger drive shaft steps, detent means establishing a plurality of positions for said rotatable knob, and a generally vertical abutment on said cam for arcuate engagement with said cam follower when said detent means is in one of said detent positions to positively engage the side of said cam follower to relatively retract said idler wheel and drive shaft.

5. In a plural speed phonograph drive mechanism having a turntable with a downturned rim and journalled on a frame and operable from a generally vertical drive shaft having different effective diameters at different levels, said mechanism comprising, in combination, an idler wheel carried on the frame for vertical and horizontal components of movement, means urging said idler wheel in a direction for concurrent engagement with the turntable rim and drive shaft, a cam follower pin, means linking said idler wheel to said cam follower pin for concurrent movement, said cam follower pin extending generally vertically outside said turntable, a manually rotatable knob having a cam journalled relative to the frame for cooperation with said cam follower pin, said cam having plateaus joined by inclined cam surfaces, each of said plateaus corresponding to a desired height of said idler wheel to cooperate with different effective drive shaft diameters for selected speeds of the phonograph turntable, and movement of said knob in one direction causing said cam follower pin to ride on one of the inclined cam surfaces which imparts a movement with a horizontal component to said idler wheel to retract same from the drive shaft concurrently with a change in elevation of said idler wheel toward larger effective drive shaft diameters.

6. In a plural speed phonograph drive mechanism having a turntable with a downturned rim and journalled on a frame and operable from a generally vertical drive shaft having different effective diameters at different levels, said mechanism comprising, in combination, an idler wheel carried on the frame for vertical and horizontal components of movement, means urging said idler wheel in a direction for concurrent engagement with the turntable rim and drive shaft, a cam follower pin, means linking said idler wheel to said cam follower pin for concurrent movement, said cam follower pin extending generally vertically outside said turntable, a manually rotatable knob having a cam journalled relative to the frame for cooperation with said cam follower pin, said cam having plateaus joined by inclined cam surfaces, each of said plateaus corresponding to a desired height of said idler wheel to cooperate with different effective diameters of the drive shaft for selected speeds of the phonograph turntable, movement of said knob in one direction causing said cam follower pin to ride on one of the inclined cam surfaces which imparts a movement with a horizontal component to said idler wheel to retract same from the drive shaft concurrently with a change in elevation of said idler wheel toward larger effective drive shaft diameters, detent means establishing a plurality of positions for said rotatable knob, and a vertical abutment on said cam for arcuate engagement with said cam follower pin when said detent means is in one of said detent positions to positively engage the side of said cam follower pin to retract said idler wheel from engagement with the drive shaft.

7. In a plural speed phonograph drive mechanism having a turntable with a downturned rim and journalled on a frame and operable from a vertically stepped drive shaft at a location inside said turntable rim, said mechanism comprising, in combination, an idler wheel carried on the frame for vertical and horizontal components of movement, idler spring means urging said idler wheel in a direction for concurrent engagement with the turntable rim and drive shaft, a cam follower pin, means linking said idler wheel to said cam follower pin for concurrent movement, said cam follower pin extending upwardly outside said turntable, an indicator and control assembly including a manually rotatable knob having a downwardly facing cam journalled relative to the frame for cooperation with said cam follower pin, indicia cooperating with said rotatable knob, spring means urging together said cam and cam follower pin, said cam having horizontal plateaus joined by inclined cam surfaces, each of said plateaus corresponding to a desired height of said idler wheel to cooperate with different drive shaft steps for selected speeds of the phonograph turntable, movement of said knob in one direction causing said cam follower pin to ride on one of the inclined cam surfaces which imparts a movement with a horizontal component to said idler wheel to retract same from the drive shaft concurrently with a change in elevation of said idler wheel toward larger drive shaft steps, detent means establishing a plurality of positions for said rotatable knob, and a vertical abutment on said cam adjacent one of said plateaus for arcuate engagement with said cam follower pin when said detent means is in one of said detent positions to positively engage the vertical side of said cam follower pin to retract said idler wheel from engagement with the drive shaft.

8. In a plural speed phonograph drive mechanism carried on a frame and operable from a vertically stepped drive shaft, said mechanism comprising, in combination, a lifter bracket carried on the frame for vertical and horizontal components of movement of first and second parts thereof, an idler wheel carried on said first part of said lifter bracket, idler spring means urging said idler wheel in a direction for engagement with the drive shaft, a cam follower pin, means adjustably carrying said cam follower pin in said second part of said lifter bracket and extending upwardly above the frame, a manually rotatable knob having a downwardly facing cam journalled relative to the frame for cooperation with said cam follower pin, spring means urging together said cam and cam follower pin, said cam having horizontal plateaus joined by inclined cam surfaces, each of said plateaus corresponding to a desired height of said idler wheel to cooperate with different drive shaft steps for selected speeds of said idler wheel, movement of said cam in one direction causing said cam follower pin to ride on one of the inclined cam surfaces which imparts a movement with a horizontal component to said lifter bracket to cause a retract movement of said idler wheel from the drive shaft concurrently with a change in elevation of said lifter bracket toward larger drive shaft steps, detent means establishing a plurality of positions for said rotatable knob, and a vertical abutment on said cam adjacent one of said plateaus for arcuate engagement with said cam follower pin when said detent means is in one of said detent positions to positively engage the vertical side of said cam follower pin and horizontally move said lifter bracket to retract said idler wheel from engagement with said drive shaft.

9. In a plural speed phonograph drive mechanism having a turntable with a downturned rim and journalled on a frame and operable from a vertically stepped drive shaft at a location inside said turntable rim, said mechanism comprising, in combination, a lifter bracket carried on the frame for vertical and horizontal components of movement of first and second parts thereof, an idler wheel carried on said first part of said lifter bracket, idler spring means urging said idler wheel in a direction for concurrent engagement with the turntable rim and drive shaft, a cam follower pin, means adjustably carrying said cam follower pin in said second part of said lifter bracket and extending upwardly outside the turntable, a manually rotatable knob having a downwardly facing cam journalled relative to the frame for cooperation with said cam follower pin, spring means urging together said cam and cam follower pin, said cam having horizontal plateaus joined by inclined cam surfaces, each of said plateaus corresponding to a desired height of said idler wheel to cooperate with different drive shaft steps for selected speeds of the phonograph turntable, and movement of said cam in one direction causing said cam follower pin to ride on one of the inclined cam surfaces which imparts a movement with a horizontal component to said lifter bracket to cause a retract movement of said idler wheel from the drive shaft concurrently with a change in elevation of said lifter bracket toward larger drive shaft steps.

10. In a plural speed phonograph drive mechanism having a turntable with a downturned rim and journalled on a frame and operable from a vertically stepped drive shaft at a location inside said turntable rim, said mechanism comprising, in combination, a lifter bracket carried on the frame for vertical and arcuate components of movement of first and second sides thereof, an idler wheel carried on said first side of said lifter bracket, idler spring means urging said idler wheel in a direction for concurrent engagement with the turntable rim and drive shaft, a cam follower pin, thread means carrying said cam follower pin in said lifter bracket second side and extending upwardly outside the turntable, an indicator and control assembly including a manually rotatable downwardly facing cam journalled relative to the frame for cooperation with said cam follower pin, spring means urging together said cam and follower pin, said cam having horizontal plateaus joined by inclined cam surfaces, each of said plateaus corresponding to a desired height of said idler wheel to cooperate with different drive shaft steps for selected speeds of the phonograph turntable, movement of said cam in one direction causing said cam follower pin to ride on one of the inclined cam surfaces which imparts an arcuate movement to said lifter bracket to cause a retract movement of said idler wheel from the drive shaft concurrently with a change in elevation of said lifter bracket toward larger drive shaft steps, detent means establishing a plurality of positions for said rotatable cam, and a vertical abutment on said cam adjacent one of said plateaus for arcuate engagement with said cam follower pin when said detent means is in one of said detent positions to positively engage the vertical side of said cam follower pin and horizontally move said lifter bracket to retract said idler wheel from engagement with the drive shaft.

11. In a plural speed phonograph drive mechanism having a turntable with a downturned rim and journalled on a frame and operable from a vertically stepped drive shaft at a location inside said turntable rim, said mechanism comprising, in combination, a lifter bracket carried on the frame for movements having a vertical component and an arcuate component and having first and second sides, an idler wheel carried on said first side of said lifter bracket, idler spring means urging said idler wheel in a direction for concurrent engagement with the turntable rim and drive shaft, a vertical threaded aperture in said second side of said lifter bracket, a cam follower pin threaded in said lifter bracket aperture and extending upwardly outside said turntable, an indicator and control assembly including a manually rotatable downwardly facing cam journalled relative to the frame for cooperation with said cam follower pin, spring means urging together said cam and follower pin, said cam having horizontal plateaus joined by inclined cam surfaces, each of said plateaus corresponding to a desired height of said idler wheel to cooperate with different drive shaft steps for selected speeds of said phonograph turntable, and movement of said cam in one direction causing said cam follower pin to ride on one of the inclined cam surfaces which imparts an arcuate movement to said lifter bracket to cause a retract movement of said idler wheel from said drive shaft concurrently with a change in elevation of said lifter bracket toward larger drive shaft steps.

12. A plural speed phonograph drive mechanism comprising, in combination, a frame, a turntable journalled on said frame and having a downturned rim, a motor carried on said frame and having a vertically stepped drive shaft extending upwardly to a level above said frame at a location inside said turntable rim, a lifter bracket movably carried on said frame for movements having a vertical component and having an arcuate movement of first and second sides thereof, an idler wheel carried on said first side of said lifter bracket, an idler spring urging said idler wheel into concurrent engagement with said turntable rim and said drive shaft, a vertical threaded aperture in said second side of said lifter bracket, a cam follower pin threaded in said lifter bracket aperture and extending upwardly outside said turntable, an indicator and control assembly including a manually rotatable downwardly facing cam journalled on said frame for cooperation with said cam follower pin, spring means urging together said cam and cam follower pin, said cam having horizontal plateaus joined by inclined cam surfaces, each of said plateaus corresponding to a desired height of said idler wheel to cooperate with different drive shaft steps for selected speeds of said phonograph turntable, movement of said cam in one direction causing said cam follower pin to ride on one of the inclined cam surfaces which imparts an arcuate movement to said lifter bracket to cause a retract movement of said idler wheel from said drive shaft concurrently with a change in elevation of said lifter bracket toward larger drive shaft steps, detent means establishing means cooperating with said rotatable cam and said frame establishing a plurality of positions for said rotatable cam, and a vertical abutment on said cam adjacent one of said plateaus for arcuate engagement with said cam follower pin when said detent means is in one of said detent positions to positively engage the vertical side of said cam follower pin and horizontally swing said lifter bracket to retract said idler wheel from engagement with said drive shaft.

13. A plural speed phonograph drive mechanism comprising, in combination, a horizontal frame, a turntable journalled on said frame and having a downturned rim, a motor carried on said frame and having a vertically stepped drive shaft extending upwardly to the level of the turntable rim at a location inside said turntable rim, a lifter bracket journalled on said frame for vertical sliding and arcuate movements and having first and second sides, spring means urging upwardly said lifter bracket, an idler plate assembly having first and second ends with said first end journalled in said first side of said lifter bracket, an idler wheel journalled on said second end of said idler arm, an idler spring urging said idler wheel into concurrent engagement with said turntable rim and said drive shaft, a vertical threaded aperture in said second side of said lifter bracket, a cam follower pin threaded in said lifter bracket aperture and extending upwardly loosely through a large aperture in said frame outside said turntable, an indicator and control assembly including a rotatable downwardly facing cam journalled on said frame for cooperation with said cam follower pin, said cam having horizontal plateaus joined by inclined cam surfaces, each of said plateaus corresponding to a desired height of said idler wheel to cooperate with different drive shaft steps for a selected speed of said phonograph turntable, movement of said cam in one direction causing said cam follower pin to ride on one of the inclined cam surfaces which imparts a horizontal swinging movement to said lifter bracket to cause a retract movement of said idler plate assembly and said idler wheel from said drive shaft concurrently with a change in elevation of said lifter bracket toward larger drive shaft steps, detent means cooperating with said rotatable cam and said frame establishing a plurality of positions for said rotatable cam, and a vertical abutment on said cam adjacent one of said plateaus for arcuate engagement with said cam follower pin when said detent means is in one of said detent positions to positively engage the vertical side of said cam follower pin and horizontally swing said lifter bracket to retract said idler wheel from engagement with said drive shaft.

14. A plural speed phonograph drive mechanism comprising, in combination, a horizontal frame, a turntable journalled on said frame and having a downturned rim, a motor depending from said frame and having a vertically stepped drive shaft extending upwardly through an aperture in said frame at a location inside said turntable rim, a lifter bracket journalled on said frame for vertical sliding and arcuate movements and having first and second sides, spring means urging upwardly said lifter bracket, an idler plate assembly having first and second ends with said first end journalled in said first side of said lifter bracket, an idler wheel journalled on said second end of said idler plate, an idler spring urging said idler wheel into concurrent engagement with said turntable rim and said drive shaft, a vertical threaded aperture in said second side of said lifter bracket, a cam follower pin threaded in said lifter bracket aperture and extending upwardly loosely through a large aperture in said frame outside said turntable, an indicator and control assembly including a rotatable downwardly facing cam journalled on said frame for cooperation with said cam follower pin, said cam having horizontal plateaus joined by inclined cam surfaces, each of said plateaus corresponding to a desired height of said idler wheel to cooperate with different drive shaft steps for selected speeds of said phonograph turntable, said drive shaft having a plurality of steps thereon with the steps progressing toward smaller diameters at higher levels, movement of said cam in one direction causing said cam follower pin to ride on one of the inclined cam surfaces which imparts a horizontal swinging movement to said lifter bracket to cause a retract movement of said idler plate assembly and said idler wheel from said drive shaft concurrently with a downward change in elevation of said lifter bracket, detent means cooperating with said rotatable cam and said frame establishing a plurality of positions for said rotatable cam corresponding to the positioning of said cam follower pin at said plateaus, a vertical abutment on said cam adjacent one of said plateaus for arcuate engagement with said cam follower pin when said detent means is in one of said detent positions to positively engage the vertical side of said cam follower pin and horizontally swing said lifter bracket to retract said idler wheel from engagement with said drive shaft.

15. A plural speed phonograph drive mechanism comprising, in combination, a horizontal frame, a turntable journalled on said frame and having a downturned rim, a motor depending from said frame and having a vertically stepped drive shaft extending upwardly through an aperture in said frame at a location inside said turntable rim, a vertical lifter stud depending from said frame, a lifter bracket journalled on said lifter stud and having first and second sides, spring means urging upwardly said lifter bracket on said lifter stud, an idler plate assembly having first and second ends with said first end journalled in said first side of said lifter bracket, an idler wheel journalled on said second end of said idler plate, an idler spring engaging said frame and said idler plate assembly and urging said idler wheel into concurrent engagement with said turntable rim and said drive shaft, a vertical threaded aperture in said second side of said lifter bracket, a cam follower pin threaded in said lifter bracket aperture and extending upwardly loosely through a large aperture in said frame outside said turntable, an indicator and control assembly including a rotatable downwardly facing cam journalled on said frame for cooperation with said cam follower pin, said cam having horizontal plateaus joined by inclined cam surfaces, a detent spring carried on said frame, a detent surface on said cam cooperating with said detent spring to establish a plurality of detent positions of said cam, each of said plateaus corresponding to a desired height of said idler wheel to cooperate with different drive shaft steps for selected speeds of said phonograph turntable, said drive shaft having a plurality of steps thereon with the steps progressing toward smaller diameters at higher levels, movement of said cam in one direction causing said cam follower pin to ride on one of the inclined cam surfaces which imparts a horizontal swinging movement to said lifter bracket to cause a retract movement of said idler plate assembly and said idler wheel from said drive shaft concurrently with a downward change in elevation of said lifter bracket, movement of said cam in the opposite direction in cooperation with said cam follower pin sliding on one of said inclined cam surfaces causing a component of movement of said lifter bracket to urge said idler assembly and said idler wheel toward said drive shaft.

16. A plural speed phonograph drive mechanism comprising, in combination, a horizontal frame, a turntable journalled on said frame and having a downturned rim, a motor depending from said frame and having a vertically stepped drive shaft extending upwardly through an aperture in said frame at a location inside said turntable rim, a vertical lifter stud depending from said frame near said turntable rim, a lifter bracket journalled on said lifter stud and having first and second sides, spring means urging upwardly said lifter bracket on said lifter stud, an idler plate assembly having first and second ends with said first end journalled in said first side of said lifter bracket, an idler wheel journalled on said second end of said idler plate and adapted for simultaneous engagement with said downturned rim and a selected step of said drive shaft, an idler spring engaging said frame and said idler plate assembly and urging said idler wheel into concurrent engagement with said turntable rim and said drive shaft, a vertical threaded aperture in said second side of said lifter bracket, a cam follower pin threaded in said lifter bracket aperture and extending upwardly loosely through a large aperture in said frame outside said turntable, an indicator and control assembly including a manually rotatable rim and a stationary indicator plate, a central stud on said indicator plate, a detent spring, a screw extending upwardly through said frame and detent spring into said central stud to fixedly attach said indicator plate and said detent spring to said frame, said rotatable rim being journalled on said central stud, indicia on said stationary indicator plate and said rotatable rim indicating different speeds of said turntable, a downwardly directed cam surface on said rim adapted for cooperation with said cam follower pin, said cam surface having horizontal plateaus joined by inclined cam surfaces, a detent surface on said rim cooperating with said detent spring to establish a plurality of detent positions of said rim, each of said plateaus corresponding to a desired height of said idler wheel to cooperate with different drive shaft steps for selected speeds of said phonograph turntable, said drive shaft having a plurality of steps thereon with the steps progressing toward smaller diameters at higher levels, movement of said rim in one direction causing said cam follower pin to ride on one of the inclined cam surfaces which imparts a horizontal swinging movement to said lifter bracket to cause a retract movement of said idler plate assembly and said idler wheel from said drive shaft concurrently with a downward change in elevation of said lifter bracket, movement of said rim in the opposite direction in cooperation with said cam follower pin sliding on one of said inclined cam surfaces causing a component of movement of said lifter bracket to urge said idler assembly and said idler wheel toward said drive shaft.

17. A four speed phonograph drive mechanism comprising, in combination, a horizontal frame, a turntable journalled on said frame and having a downturned rim, a motor depending from said frame and having a vertically stepped drive shaft extending upwardly through an aperture in said frame at a location inside said turntable rim, said drive shaft having four steps thereon with the steps progressing toward smaller diameters at higher levels, a vertical lifter stud depending from said frame near said turntable rim, a lifter bracket journalled on said lifter stud and having first and second sides, a compression spring engaging the outboard end of said lifter stud and said lifter bracket and urging upwardly said lifter bracket, an idler plate assembly having first and second ends with said first end journalled in said first side of said lifter bracket, an idler wheel journalled on said second end of said idler plate and adapted for simultaneous engagement with said downturned rim and a selected step of said drive shaft, an idler spring engaging said frame and said idler plate assembly and urging said idler wheel into concurrent engagement with said turntable rim and said drive shaft, a vertical threaded aperture in said second side of said lifter bracket, a cam follower pin threaded in said lifter bracket aperture and extending upwardly loosely through a large aperture in said frame outside said turntable, an indicator and control assembly including a manually rotatable rim and a stationary indicator plate, a central stud on said indicator plate, a detent spring, a screw extending upwardly through said frame and detent spring into said central stud to fixedly attach said indicator plate and said detent spring to said frame, said rotatable rim being journalled on said central stud, indicia on said stationary indicator plate and said rotatable rim indicating four different speeds of said turntable, a downwardly directed cam surface on said rim adapted for cooperation with said cam follower pin, said cam surface having horizontal plateaus joined by inclined cam surfaces, a detent surface on said rim cooperating with said detent spring to establish five detent positions of said rim, each of said plateaus corresponding to a desired height of said idler wheel to cooperate with different drive shaft steps for selected speeds of said phonograph turntable, said plateaus including first, second, third, fourth, and fifth plateaus including said first plateau being at the highest level and said fourth plateau being at the lowest level, movement of said rim from a lower numbered plateau toward the fourth plateau causing said cam follower pin to ride on one of the inclined cam surfaces which imparts a horizontal swinging movement to said lifter bracket to cause a retract movement of said idler plate assembly and said idler wheel from said drive shaft concurrently with a downward change in elevation of said lifter bracket, movement of said rim from said fourth toward a lower numbered plateau in cooperation with said cam follower pin sliding on one of said inclined cam surfaces causing a component of movement of said lifter bracket to urge said idler assembly and said idler wheel toward said drive shaft, said fifth plateau being on the same level as said third plateau, a vertical abutment on said rim adjacent said fifth plateau for arcuate engagement with said cam follower pin when said detent spring is in said fifth detent position to positively engage the vertical side of said cam follower pin and horizontally swing said lifter bracket to retract said idler wheel from engagement with said drive shaft.

18. In a plural speed phonograph drive mechanism having a turntable with a downturned rim and journalled on a frame and operable from a generally vertical drive shaft having different effective diameters at different levels, said mechanism comprising, in combination, an idler wheel carried on the frame for vertical and horizontal components of movement and adapted for concurrent engagement with the turntable rim and drive shaft, a cam follower, means linking said idler wheel to said cam follower for concurrent movement, said cam follower extending generally vertically outside said turntable, a unitary manually rotatable knob and an inclined cam surface on the underside thereof for cooperation with said cam follower, movement of said knob in one direction causing said cam follower to ride on said inclined cam surface which imparts a movement with a horizontal component to said idler wheel to retract same from the drive shaft concurrently with a change in elevation of said idler wheel toward larger effective drive shaft diameters, and a vertical abutment on said cam surface for arcuate engagement with said cam follower to positively engage the side of said cam follower to retract said idler wheel from engagement with the drive shaft.

References Cited in the file of this patent

UNITED STATES PATENTS

| | | |
|---|---|---|
| 2,801,546 | Scheller et al. | Aug. 6, 1957 |
| 2,826,926 | Singer | Mar. 18, 1958 |
| 2,926,536 | Bradley | Mar. 1, 1960 |

FOREIGN PATENTS

| | | |
|---|---|---|
| 714,813 | Great Britain | Sept. 1, 1954 |
| 820,379 | Great Britain | Sept. 16, 1959 |